United States Patent [19]

Spiewok

[11] 4,313,992

[45] Feb. 2, 1982

[54] CENTRIFUGE SCREEN

[75] Inventor: Leonhard Spiewok, Wallisellen, Switzerland

[73] Assignee: Escher Wyss Limited, Zurich, Switzerland

[21] Appl. No.: 38,866

[22] Filed: May 14, 1979

Related U.S. Application Data

[63] Continuation of Ser. No. 922,550, Jul. 7, 1978, abandoned.

[30] Foreign Application Priority Data

Jul. 22, 1977 [CH] Switzerland ........................ 9104/77

[51] Int. Cl.3 ........................... B04B 7/16; B32B 3/24

[52] U.S. Cl. .................................... 428/136; 428/137; 428/138; 428/198; 428/201; 233/2; 233/1 E

[58] Field of Search ............... 233/2, 1 E; 210/380 R; 428/134, 137, 138, 136, 198, 201

[56] References Cited

U.S. PATENT DOCUMENTS

| | | | |
|---|---|---|---|
| 1,946,500 | 2/1934 | Roberts | 233/2 X |
| 2,695,133 | 11/1954 | Drury | 233/2 |
| 3,491,888 | 1/1970 | Colburn | 233/2 X |
| 3,572,582 | 3/1971 | Seielstad | 210/168 X |
| 3,640,760 | 2/1972 | Nichols | 428/136 |
| 3,955,754 | 5/1976 | Schaper | 210/380 R X |
| 4,072,266 | 2/1978 | Dietzel | 233/2 |

FOREIGN PATENT DOCUMENTS 1117513 11/1961 Fed. Rep. of Germany .

*Primary Examiner*—George F. Lesmes
*Assistant Examiner*—Alexander S. Thomas
*Attorney, Agent, or Firm*—Robert A. Ostmann

[57] ABSTRACT

A centrifuge screen, more particularly for a thrust-type centrifuge, having screen bars consisting of a hard material and extending axially of the centrifuge drum, said bars being fixed on a supporting frame, wherein the screen bars extending axially of the centrifuge drum bear over the entire length on the supporting frame and are connected to the supporting frame by an adhesive bonding which extends over the full length of the screen bars.

6 Claims, 9 Drawing Figures

CENTRIFUGE SCREEN

CROSS-REFERENCE TO RELATED APPLICATION

This application is a continuation of applicaton Ser. No. 922,550, filed July 7, 1978, now abandoned.

BACKGROUND OF THE INVENTION

The invention relates to a centrifuge screen, more particularly for a thrust-type centrifuge, having screen bars consisting of a hard material and extending axially of the centrifuge drum, said bars being fixed on a supporting frame.

Hard materials are materials having a high resistance to wear, for example, sintered hard metal, sintered carbides and ceramic materials.

A screen comprising wear-resistant bars is known from German Auslegeschrift No. 11 17 513, in which the said screen bars are fixed by adhesive binders on transverse members. Wear-resistant bars made of hard material are brittle and can easily break. The fragments drop into the interstices between the transverse members and the screen becomes unsuitable for use, so that it has to be replaced.

SUMMARY OF THE INVENTION

The invention has for its object to provide a centrifuge screen with screen bars of hard material, which is more resistant and has a longer effective life.

This object is achieved in accordance with the invention, in respect to a centrifuge screen of the type as initially described, by the screen bars bearing over their entire length on the supporting frame and being connected to the said frame by an adhesive extending over the full length of the said bars.

The effect of resting over the full length provides a uniform support of the screen bars, so that any danger of a breaking of the bars is reduced. The adhesive union which extends over the entire length then also ensures that the screen can continue to function if a screen bar should break. The fragments are in fact held in their operating position. Furthermore, the adhesive bonding forms a layer of coating which in itself is movable, so that small relative movements between the hard screen bars and the supporting frame, such as those which can, for example, occur because of varying heat expansion, are readily possible.

The adhesive surfaces of the screen bars and the adhesive surfaces of the supporting frame are advantageously provided with a curvature differing from one to the other.

The adhesive layer may with advantage contain an intermediate layer of rubber.

It is likewise advantageous if, as regards the adhesive which extends over the full length of the screen bars, the sticking surface of the said bars or of the supporting frame is subdivided into a plurality of small surfaces.

It is advantageous for the supporting frame to be a perforated plate, the holes of the perforated plate preferably lying with their centres in the region of the gaps left free between the screen bars.

It is also very advantageous for the supporting frame to be a wire mesh.

The supporting frame may with advantage also consist of a grid or grating with members extending transversely of the screen bars and with grating bars which extend axially of the centrifuge drum and on which the screen bars rest.

For the sticking operation, it is advantageous to use a foil of synthetic resin adhesive which, extending over the entire screen surface, is positioned between the screen bars and the supporting frame, and of which the adhesive substance is drawn back during the sticking operation into the spaces between the adhesive surfaces of the screen bars and the supporting frame.

BRIEF DESCRIPTION OF THE DRAWING

Constructional examples of the arrangement according to the invention are represented in simplified form in the drawing, by reference to which the invention is more fully explained and in which.

DESCRIPTION OF THE PREFERRED EMBODIMENTS

Figure 1:
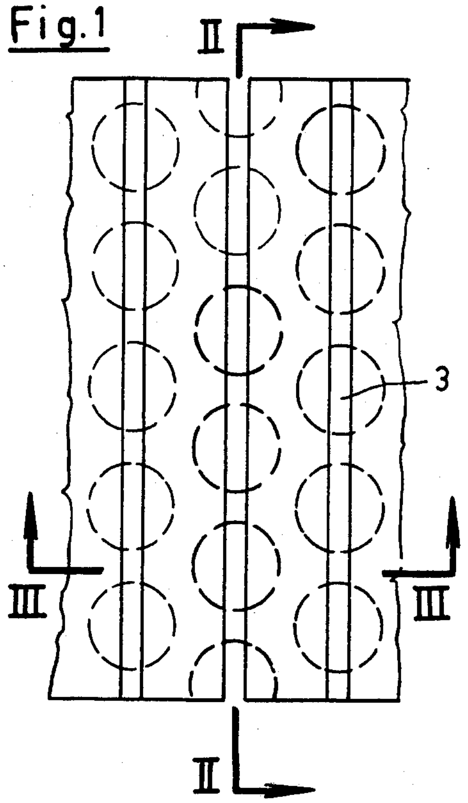
FIG. 1 is a plan view of a centrifuge screen.
Figure 2:
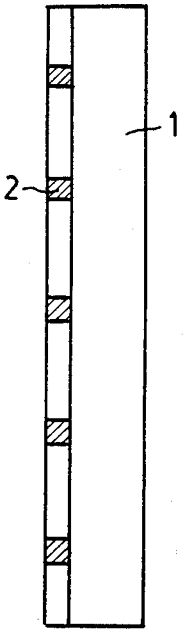
FIG. 2 is a section on the line II—II of FIG. 1.
Figure 3:
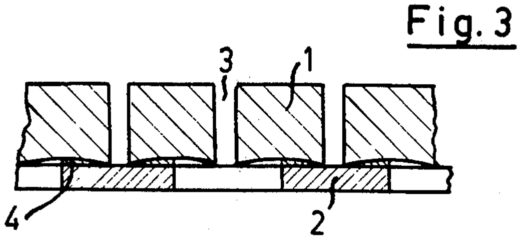
FIG. 3 is a section on the line III—III of FIG. 1.

The centrifuge screen which is shown in FIGS. 1 to 3 for a thrust-type centrifuge comprises screen bars 1 which extend axially of the centrifuge drum of the centrifuge and which consist of a sintered hard metal. The screen bars 1, consisting of a hard material with high resistance to wear, rest throughout their length on a supporting frame 2. The said bars 1 are connected to the supporting frame 2 by an adhesive 4, which extends over the full length of the screen bars.

Those adhesion surfaces of the screen bars 1 and of the supporting frame 2 which adjoin the adhesive 4 have a curvature differing from one another, so that the layer or coating of the adhesive has a larger volume.

As a result of interposing the adhesive 4 between the screen bars 1 and the supporting frame 2, it becomes possible for the said bars to be movable relatively to the supporting frame, which enables the screening bars and the supporting frame to be made of different materials, more especially, materials which have different coefficients of expansion, i.e. for the bars of brittle hard material to be fixed on a bendable supporting frame.

Figure 4:
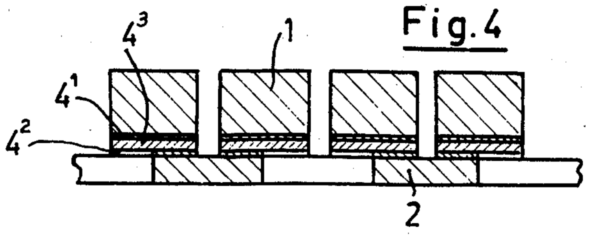
FIG. 4 is a section corresponding to FIG. 3, through another centrifuge screen.

The adhesive bonding according to FIG. 4 comprises two adhesive layers $4^1$ and $4^2$ and intermediate rubber layer $4^3$ so that the possibility of movement between the screen bars 1 and the supporting frame 2 is even greater.

As regards the screen according to FIGS. 1 to 3, the supporting frame is formed by a perforated metal plate. In this case, the holes of the perforated plate are arranged with their centres in the region of the gaps 3 which are left between the screen bars 1. As a result, the supporting frame 2 is reduced in the region of the gaps 3 to small bridges.

Figure 5:
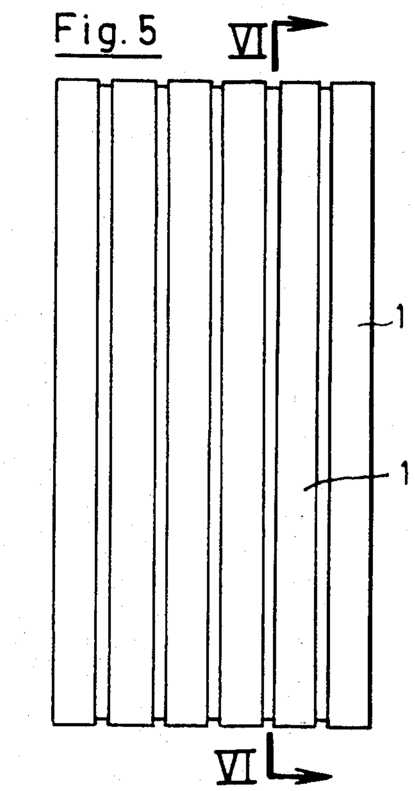
FIG. 5 is a plan view of another centrifuge screen.
Figure 6:
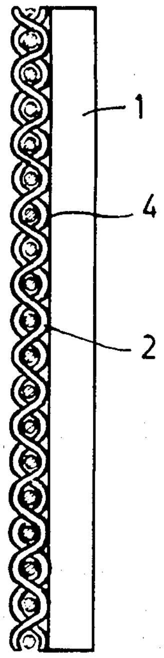
FIG. 6 is a section on the line VI—VI of FIG. 5.

With the screen according to FIGS. 5 and 6, a supporting frame 2 is formed by a wire mesh fabric, the meshes of which are respectively connected by an adhesive 4 to the screen bars 1. The adhesive surfaces of the screen bars and of the supporting frame are in this case split up into a plurality of small surfaces.

A foil of synthetic resin adhesive is more particularly employed for the adhesive bonding of the screen according to FIGS. 5 and 6, the said adhesive being applied, extending over the entire screen surface, between the screen bars and the supporting frame, and the adhesive substance thereof, during the sticking operation, being drawn back into the spaces between the adhesion surfaces of the screen bars and of the supporting frame. In this way, those parts of the screen which are outside the adhesion surface remain free from adhesive.

Figure 7:
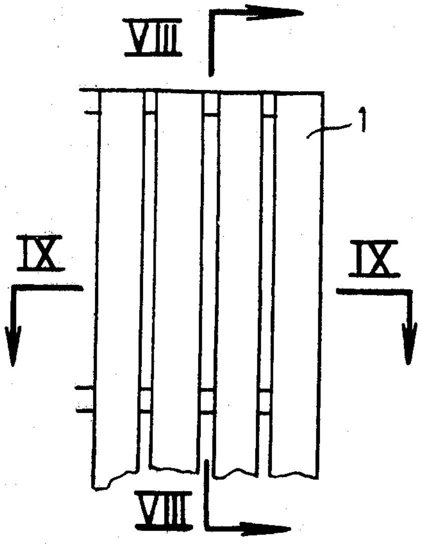
FIG. 7 is a plan view of another centrifuge screen.
Figure 8:
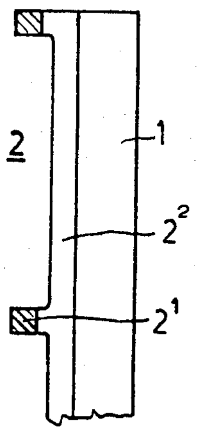
FIG. 8 is a section on the line VIII—VIII of FIG. 7.
Figure 9:
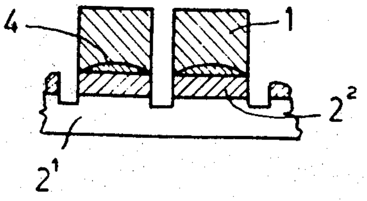
FIG. 9 is a section on the line IX—IX of FIG. 7.

As regards the screen according to FIGS. 7 to 9, a supporting frame 2 consists of a grid or grating, which comprises members $\mathbf{2}^1$ extending circumferentially of the centrifuge drum and grating bars $\mathbf{2}^2$ extending axially of the said drum. Arranged on the grating bars $\mathbf{2}^2$ are screen bars 1, which are connected to the grating bars $\mathbf{2}^2$ by an adhesive bonding 4.

The centrifuge screens are represented in the drawing in a flat position. For the fitting into the centrifuge drum, the supporting frame 2 is curved into the form of a cylindrical jacket which corresponds to the internal surface of the centrifuge drum. As a result, the screen bars 1 are moved closer to one another. With the constructional examples as illustrated, with which the screen bars 1, in the flat state of the screen, define a gap 3 with parallel walls, the curved screen presents a gap 3 which widens out in an outward radial direction.

The profile of cross-section of the screen bars 1 may, however, also be so chosen that the gap 3 remains the same size or is decreased in the radial direction with the curving of the screen. Moreover, the gap 3 when the screen is curved may be composed of parallel parts, parts which become wider radially, and parts which become narrower radially.

I claim:

1. A screen for the drum of a centrifuge comprising a supporting frame, and a plurality of transversely spaced screen bars which are oriented to extend axially of the drum for which the screen is intended, are made of a hard material, and serve to support material which is being centrifuged as the material moves axially through the drum, and characterized in that the frame is a perforated plate so constructed that it supports each bar over the entire length of the bar; and in that each bar is connected to the frame by an adhesive joint which also extends over the entire length of the bar.

2. A centrifuge screen as defined in claim 1 in which the perforations of said plate are centered in the transverse spaces between the screen bars.

3. A screen for the drum of a centrifuge comprising a supporting frame, and a plurality of transversely spaced screen bars which are oriented to extend axially of the drum for which the screen is intended, are made of a hard material, and serve to support material which is being centrifuged as the material moves axially through the drum, and characterized in that the frame is a grid having members which extend transversely of said screen bars and grating bars which extend axially of the screen bars and on which the screen bars rest, whereby the frame supports each bar over the entire length of the bar; and in that each bar is connected to the frame by an adhesive joint which also extends over the entire length of the bar.

4. A centrifuge screen as defined in claim 1 or claim 3 in which the adhesive joint between each screen bar and the frame includes mating surfaces of the bar and the frame which have different curvatures.

5. A centrifuge screen as defined in claim 1 or claim 3 in which the adhesive joint includes an intermediate layer of rubber.

6. A centrifuge screen as defined in claim 1 or claim 3 in which the screen bars and the frame are so constructed that said adhesive joint consists of a multitude of small adhesive connections distributed over the entire length of the bar.

* * * * *